United States Patent [19]
McCrory et al.

[11] Patent Number: 5,967,486
[45] Date of Patent: Oct. 19, 1999

[54] AUTOMATED ACTUATOR FOR PULL-OPEN, PUSH-CLOSED VALVES

[76] Inventors: Gene A. McCrory, P.O. Box 410208 Concord Bridge E-19, Big Water, Utah 84741-2208; David L. Rehder, 22472 Queen St., Castro Valley, Calif. 94546

[21] Appl. No.: 08/858,630

[22] Filed: May 20, 1997

[51] Int. Cl.[6] .......................... F16K 31/122; F16K 31/44
[52] U.S. Cl. ............................... 251/58; 74/110; 74/516; 74/520; 74/522; 251/232; 251/279; 251/280
[58] Field of Search .............................. 251/58, 279, 280, 251/229, 14, 231, 232; 74/110, 516, 54, 519, 520, 522

[56] References Cited

U.S. PATENT DOCUMENTS

| | | | |
|---|---|---|---|
| 677,940 | 7/1901 | Carr | 251/58 |
| 1,156,392 | 10/1915 | Conrader | 251/58 |
| 1,395,551 | 11/1921 | Brand | 251/280 |
| 2,296,213 | 9/1942 | Kretzschmar | 251/58 |
| 2,358,186 | 9/1944 | Pond | 251/58 |
| 2,530,652 | 11/1950 | Davis | 251/58 |
| 2,874,924 | 2/1959 | Good | 251/58 |
| 3,342,449 | 9/1967 | Jackson | 251/58 |
| 4,570,900 | 2/1986 | Lonardi et al. | 251/232 |
| 4,815,696 | 3/1989 | Lonardi | 251/232 |
| 4,821,998 | 4/1989 | Legille et al. | 251/232 |
| 5,074,325 | 12/1991 | Rumberger et al. | 251/58 |

FOREIGN PATENT DOCUMENTS

| | | | |
|---|---|---|---|
| 382119 | 10/1932 | United Kingdom | 251/279 |
| 1147278 | 4/1969 | United Kingdom | 251/58 |

OTHER PUBLICATIONS

Varian Vacuum Products, Inc. 1993/1994 Catalog, 172 J.F. O'Hanlon, A User's Guide to Vacuum Technology, Chaps. 6 & 11 (J. Wiley & Sons 1980).

R.R. LaPelle, Practical Vacuum Systems, 18–21 (McGraw–Hill '72).

P.A. Redhead, et al., The Physical Basis of Ultrahigh Vacuum, 100–105 (Chapman and Hall 1968).

Primary Examiner—George L. Walton
Attorney, Agent, or Firm—Peter B. Scull

[57] ABSTRACT

A valve actuator having a pivotal cam-lever driven push-pull mechanical linkage system. A power mechanism moves a cam-lever member which then moves a connecting rod to move a push-pull member to lift out or push in a conventional valve stem. This then opens or closes the valve. In an alternative embodiment, the actuator includes an adjustable block member to which the cam-lever is pivotally attached. This provides a separate adjustability for the ultimate maximum movement of the push-pull member and thereby also of the valve stem in order to ensure a proper closing force is imparted to the valve. Also in this embodiment, it is preferred that the push-pull member includes at least one spring washer disposed therein. This provides a desirable compressibility in the system during the imposition of the force that the push-pull member exerts on the valve stem during the opening and/or closing process.

19 Claims, 7 Drawing Sheets

FIG. 1

FIG. 2-A
Sealed Position

FIG. 2-B
Open Position

FIG. 6
Open Position

FIG. 7
Sealed Position

AUTOMATED ACTUATOR FOR PULL-OPEN, PUSH-CLOSED VALVES

INTRODUCTION

The present invention is directed generally to devices which mechanically maneuver valve controls to pull open and/or to push to close the valve.

BACKGROUND

Many valves in, for example, high and ultra high vacuum systems are of a push-pull type which are manipulated into open and closed positions by hand tools. Some valves of this type also generally do not provide readily available accommodation for automation. Other currently available valves in this art which are automated suffer numerous drawbacks. A primary drawback is in the inability of the previous automation devices to withstand the high temperatures necessarily associated with the operation of ultra high vacuum systems.

In particular, ultra high vacuum systems must be operated at very high temperatures (on the order of about 350 degrees centigrade) for several hours during the initial pumping period. This cleans the vacuum system by what is called "outgassing" the internal surfaces of the system. Thus cleaned, the ultimate desired quality of vacuum can be reached. This is also referred to as the "bake-out" procedure.

Additionally, these high temperatures dictate that valves employed in ultra high vacuum systems be limited as to the materials used in their fabrication. Thus, all the materials in each valve must have inherent characteristics sufficient to withstand the rigors of cycling between normal operating temperatures (room temperature) and approximately 350 degrees centigrade. This usually means stainless steels are used for nearly every part of such a valve. An exception is the usually copper sealing portion of the valve element which is forced onto and against a knife-edge valve seat of stainless steel. Again, because of the temperature extremes, other materials such as rubbers, plastics, aluminum and brass cannot be used at the seal interface. Background materials which describe vacuum systems in more detail particularly regarding the bake-out and outgassing procedures as well as choices of materials include: VARIAN Vacuum Products, Inc. 1993/1994 Catalog, 172; J. F. O'Hanlon, A User's Guide to Vacuum Technology, Chapters 6 and 11 (J. Wiley & Sons 1980); R. R. LaPelle, Practical Vacuum Systems, 18–21 (McGraw-Hill 1972); P. A. Redhead, et. al., The Physical Basis of Ultrahigh Vacuum, 100–105 (Chapman and Hall 1968).

Moreover, a still further consideration involving the high temperature baking out of the ultra high vacuum system is that the cleanliness of the system, in addition to the precision used in manufacturing the valve parts, is what governs the force necessary to achieve and maintain a seal between the copper portion of the valve element and the knife-edge valve seat. A cleaner, more precisely manufactured valve will require less force to maintain valve closure regardless the vacuum forces in the system.

Examples of valves of this type used in ultra high vacuum systems include those made by VARIAN Vacuum Products, Inc., model no. 951-5014, inter alia. Note, this and similar models of valves are currently manually operated by the turning of a drive screw which ultimately pushes in the valve stem to close the valve and pulls it out to open it.

In view of the foregoing, there appears to be a need for valve actuators for existing push-pull valves such that the actuators provide ready, non-manual operation and also endure the extreme conditions inherent in high and ultra high vacuum systems.

BRIEF SUMMARY OF THE INVENTION

The present invention relates generally to valve actuators and more specifically to a pivotal cam-lever driven, push-pull valve actuator. A power driver mechanism forces the pivotal action of the cam-lever member which then moves a connecting rod which, in turn, pushes or pulls a push-pull member that ultimately lifts out or pushes in a conventional valve stem. This then opens or closes the valve.

In a preferred embodiment, the present invention includes an adjustable block member to which a cam-lever such as that introduced above may be pivotally attached. This provides an adjustment feature for assuring that the proper closure force has been set to keep the valve sealed. In this embodiment, the push-pull member also includes one or more spring washers. One purpose fulfilled by the spring washers is to provide adjustability to the compression force for maintaining valve closure. This adjustability allows for ensuring a sufficient closure force while also limiting it to prevent an oversqueeze, i.e., the unnecessary excess force which increases wear on the valve element. The spring washers also provide for allowing the cam-lever and connecting rod assembly to rotate beyond center to lock the actuator in closed position.

Preferably, all of the above embodiments include a support sleeve which is attached to and about the valve body. All other components are then disposed on or within the sleeve. The support sleeve then provides the foundation for holding all other elements in proper operating position.

Accordingly, the primary object of the present invention is to provide a valve actuator which will withstand the extreme conditions inherent in high and ultra high vacuum systems.

Another object is to provide a mechanical adjustment feature for assuring a proper sealing force is applied by the actuator to the valve.

Yet another object is to provide for locking the moving actuator elements in closed position.

Still another object is to provide for locking the actuator elements in open position.

And, yet still another object is to provide a support structure which readily attaches to an existing valve body.

These and still further objects are achieved by the present invention as will be demonstrated in the following description of preferred embodiments which should be examined in concert with the attached drawings in which like parts are identified by like numbers throughout the several views.

BRIEF DESCRIPTION OF THE DRAWINGS

In the drawings:

FIG. 2A shows a cut-away sectional view of an actuator as in FIG. 2 in which the valve and actuator components are disposed in valve sealed position;

FIG. 2B shows a cut-away sectional view of an actuator as in FIG. 2A in which the valve and actuator components are disposed in valve open position;

DESCRIPTION OF THE PREFERRED EMBODIMENT

Figure 1:
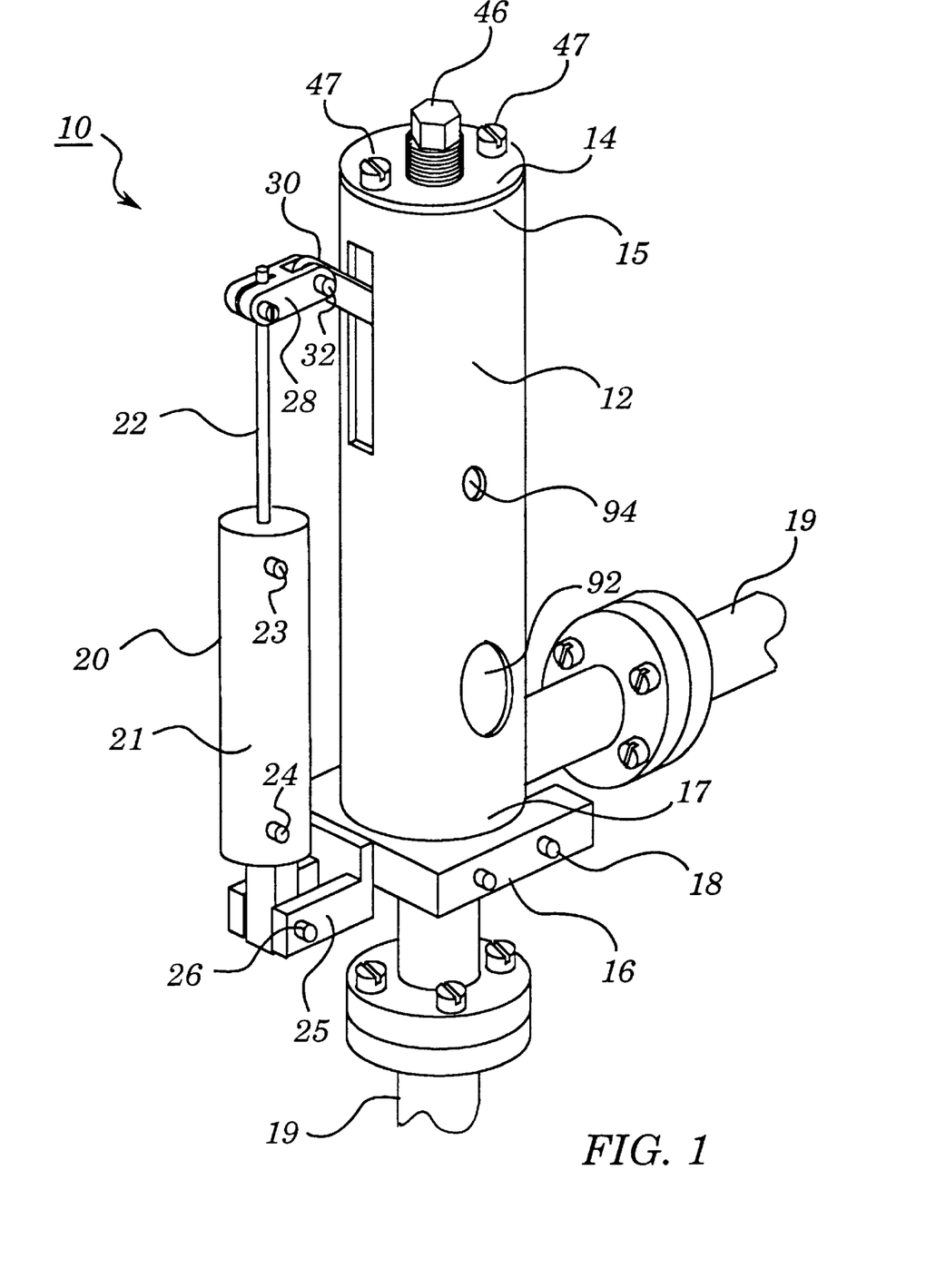
FIG. 1 shows an isometric view of an actuator of the present invention as disposed on a vacuum valve and vacuum piping.

An actuator of the present invention is shown and identified generally in the attached drawings by the reference numeral 10. Actuator 10, as shown in FIG. 1, includes a support sleeve 12 which, as will be described further below, is preferably attached to a high or ultra high vacuum valve (which is not directly shown in FIG. 1). Actuator 10 also includes an end cap 14 attached (preferably welded) to and enclosing top end 15 of sleeve 12. In this embodiment, a support base 16 is attached to bottom end 17 of sleeve 12 by welds. Base 16 and sleeve 12 are then attached to the valve by one or more securing pins 18. Thus, as disposed on the valve and pipes 19 of the vacuum system, base 16 and support sleeve 12 provide the foundation for the other elements of actuator 10.

In the preferred embodiment, a double acting pneumatic power driver device 20 is used to drive the action of actuator 10. Device 20 imparts a moving force to the system through movement of a piston (not shown) and a piston rod 22 in a fashion understood in the art. Pneumatic driver 20 generally comprises a cylinder 21, a piston (not shown) disposed inside cylinder 21, a piston rod 22, and two air inlets, an upper inlet 23 and a lower inlet 24. Air, or as may otherwise be desired, another pressurized gas, may be forced into either inlet 23 or 24 at any time to drive the piston in the desired direction. This movement of the piston thus also moves piston rod 22 up or down as desired. As is generally understood, air forced (under pressure) into inlet 23 will force the piston in a relative downward direction when pneumatic driver 20 is oriented as shown. This then forces rod 22 downward also. Contrarily, air forced into inlet 24 will force the piston and rod 22 in an upward direction.

Pneumatic driver 20 is connected at its lower end as shown to a connecting member 25. A pivot pin 26 is used at this connection point. Connecting member 25 is preferably securely attached to base 16 and/or sleeve 12 by welding. Pneumatic driver 20 is thereby made pivotal relative to sleeve 12, base 16 and connecting member 25.

The top end of piston rod 22 is securely connected to a connecting member 28 which is, in turn, connected to a system of mechanical linkages which will now be described in detail starting with cam-lever 30. Connecting member 28 is pivotally connected to cam-lever 30 such that cam-lever 30 pivots about the pivot pin 32 which secures the connection of member 28 to cam-lever 30.

Figures 2, 3:
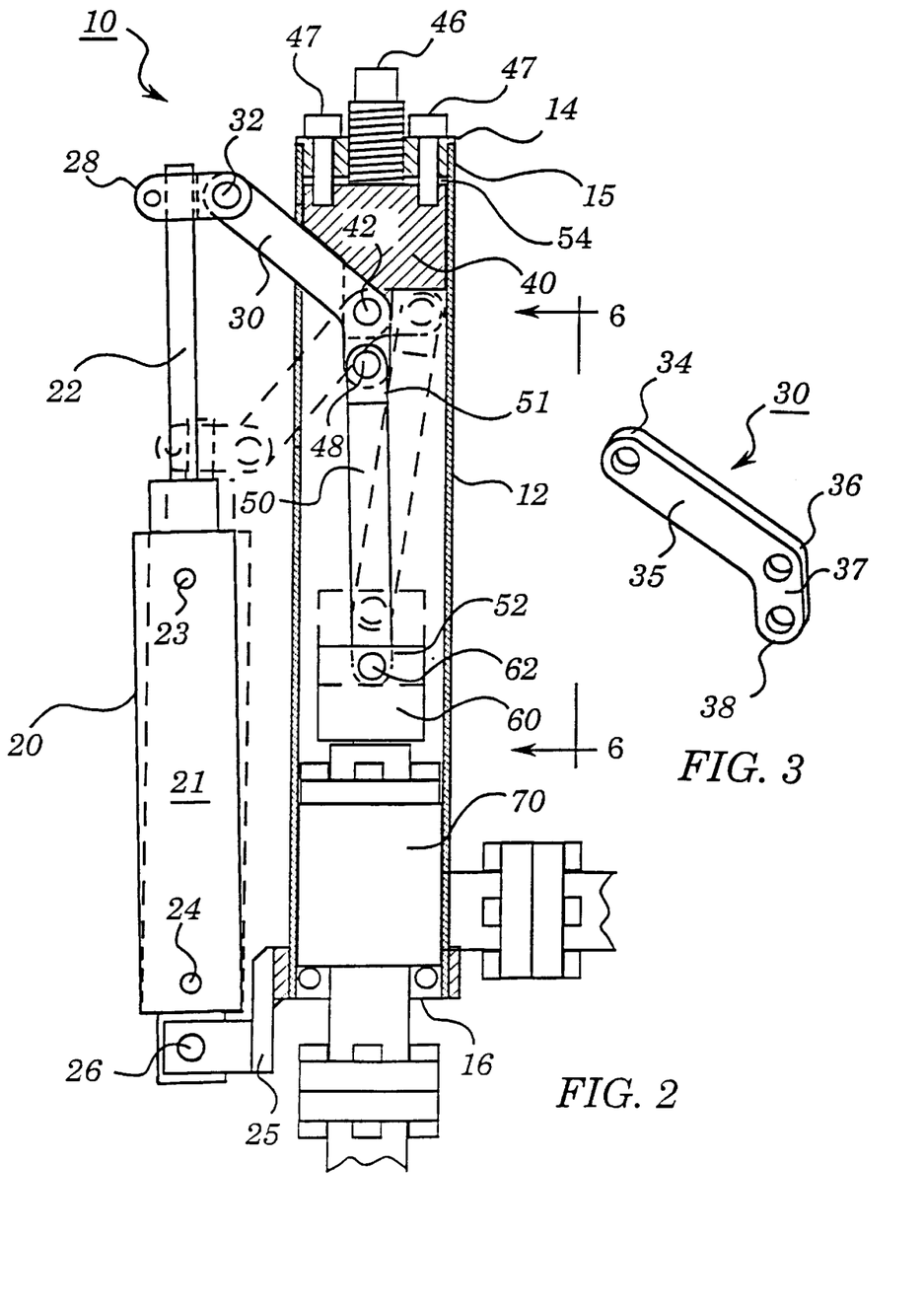
FIG. 2 shows a longitudinal cross-sectional view of the actuator of FIG. 1.
FIG. 3 shows an isometric view of a component part of the actuator of FIGS. 1 and 2.
Figure 2:
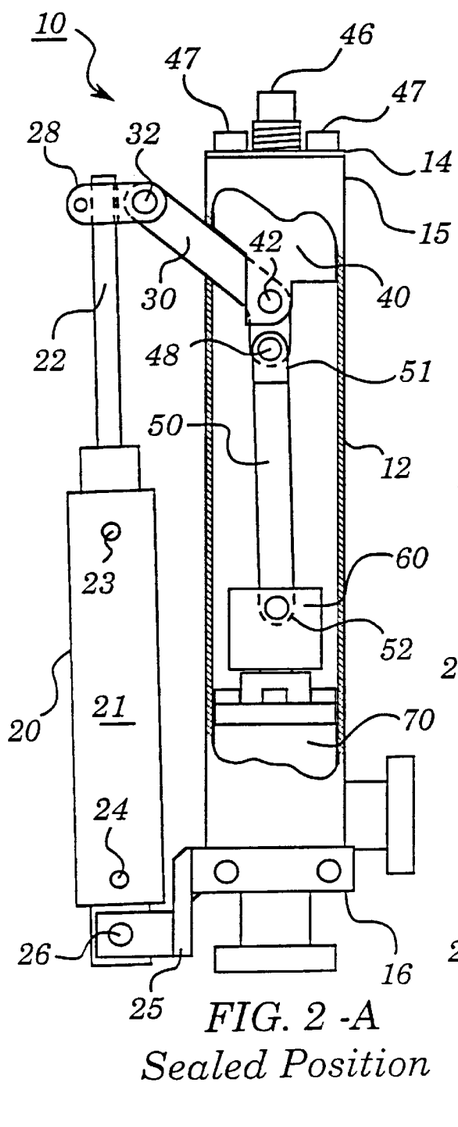

As shown in FIG. 2 and in more detail in FIG. 3, cam-lever 30 has a first end 34, an elongated lever portion 35, a bent portion 36, and a shorter portion 37 which is adjacent second end 38. The angle defined by bent portion 36 between portions 35 and 37 is greater than 90 degrees and less than 180 degrees. An angle of between 130 and 140 degrees is preferred. Although a bent cam-lever is shown and described in the preferred embodiment, member 30 may embody a plurality of distinct shapes so long as it defines three pivot points (as will be described) which are not disposed in a straight line. Thus, words such as "bent" are not intended to be limiting, rather only facilitory of description of the preferred embodiment shown in the drawings.

As is shown particularly in FIG. 2, cam-lever 30 is pivotally connected at or near bent portion 36 to an adjustable block 40. A pivot pin 42 extends through respective holes defined in one or more lower extensions or legs 44 of block 40 as well as through the corresponding hole defined in bent portion 36 of cam-lever 30. (Legs 44 are shown better in the isolation views of FIGS. 4 and 5.) Pivot pin 42 defines a linkage pivot point which appears at the center of the circle representing pin 42 in FIG. 2. Cam-lever 30 thereby has only a pivotal moving relationship relative to adjustable block 40 (as opposed to a translational relationship). As will be described in more detail below, adjustable block 40 is preferably adjustably fixed in operative position within top end 15 and under cap 14 of sleeve 12 by the coaction of a drive screw 46 and one or more locking screws 47. Still further features of block 40 will also be described below after the description of the sub-assemblage of mechanical linkages has been completed.

Cam-lever 30 is pivotally connected at its second end 38 via a pivot pin 48 to the first end 51 of a connecting rod 50. Rod 50 is preferably a substantially straight member which has an upper yoke into which the second end 38 of cam-lever 30 is pivotally fixed (see FIG. 6 for the yoke connection). Rod 50 is also pivotally connected at its second end 52 to a push-pull assembly 60. A pivot pin 62 is used to make this connection. Push-pull assembly 60 is, in turn, connected to the pre-existing valve stem (not shown in FIG. 2) of an existing valve 70. The details of the connection of push-pull assembly 60 to valve 70 will be described in more detail with reference to FIGS. 6 and 7, below.

A general description of the operative movements of the mechanical linkages (particularly cam-lever 30, connecting rod 50, and push-pull assembly 60) will now be described. As shown in FIG. 2, the starting point of this operative description will be the valve-closed position, which is also the position in which all the above-identified linkages are shown in solid lines (as opposed to the dashed-lined versions which show the valve-open position). The valve closed/sealed position is also shown in FIG. 2A, separately from the valve open position (which is then shown in FIG. 2B).

To move from the valve-closed to the valve-open position with the preferred embodiment described thus far, air or another gas is forced into inlet 23 of pneumatic driver 20 which, as described above, moves the piston downward. The piston carries rod 22 downward as well. Rod 22 likewise carries connecting member 28 which, in turn, pulls downwardly on pivot pin 32 which thereby pivotally forces first end 34 of cam-lever 30 down to the dashed line position. This FIG. 2 representation of first end 34 of cam-lever 30 shows the amount of pivotal motion that this end of cam-lever 30 must go through relative to connecting member 28 during this one action of pneumatic driver 20.

Next, it can be seen that this pivotal movement of first end 34 also causes further linkage motion through the pivotal movement of cam-lever 30 as a whole. In particular, FIGS. 2, 2A and 2B show that cam-lever 30 pivots about pivot pin 42 (and the pivot point defined thereby) in adjustable block 40. Block 40 does not move during the process of opening or closing the valve. Rather, adjustable block 40 is adjustably movable for another purpose which will be further described below. Thus, adjustable block 40 holds motionless the pivot point of cam-lever 30 during both the valve opening and valve closing procedures. The cam-lever 30 pivot point is thereby apparent in FIGS. 2, 2A and 2B in the center of the circle representing pivot pin 42.

Once the fixed pivot point of cam-lever 30 is recognized, the further action of the pivoting of short portion 37 and second end 38 of cam-lever 30 can be more easily identified. As shown in FIGS. 2 and 2A, short portion 37 and second end 38 start out in a downwardly pointing orientation, positioned below pivot pin 42 though slightly over center (a locking position which will be shown and described in more detail with respect to FIG. 8, below). Then, movement of cam-lever 30 in pivoting about the pivot point residing in pivot pin 42 causes short portion 37 and second end 38 of cam-lever 30 to rotate counterclockwise upwardly to the valve open position shown in dashed lines in FIG. 2 and solid lines in FIG. 2B. Here, short portion 37 and second end 38 of cam-lever 30 are positioned in a nearly horizontal relationship with pivot pin 42.

This action also consequently causes pivot pin 48 (which is disposed in and through second end 38 of cam-lever 30) to lift upwardly on connecting rod 50. The connection of connecting rod 50 to second end 38 of cam-lever 30 is also pivotal so that connecting rod 50 can move freely from the nearly vertical starting position shown in solid lines in FIG. 2 to the somewhat angular second position shown in dashed lines (also from FIG. 2A to FIG. 2B). The movement of connecting rod 50 upward thereby also forces push-pull assembly 60 upward as well. This upward motion of push-pull assembly 60, when properly connected to the valve stem of a valve 70, will also lift up the valve stem and thereby open valve 70.

The contrary process for closing the valve involves the reverse action of the linkages which is initiated by forcing air into inlet 24 of pneumatic driver 20. This drives the piston and rod 22 upward thus also carrying first end 34 and elongated portion 35 of cam-lever 30 upward as well. This causes the reverse pivot of cam-lever 30 such that short portion 37 and second end 38 of cam-lever 30 are pivoted downward and clockwise to the solid line position shown in FIGS. 2 and 2A. This then forces connecting rod 50 and push-pull assembly 60 in a downward direction also so that they thereby push the valve stem into closed position. Again, the over-center, lock-closed position will be described below.

Returning now to adjustable block 40, FIG. 2 shows that adjustable block 40 is housed in first end 15 of support sleeve 12. Adjustable block 40 is held fast by locking screws 47 which mate with threaded receiving holes 49 defined in block 40. Receiving holes 49 are shown separate from screws 47 in FIGS. 4 and 5. The coaction of drive screw 46 with locking screws 47 provides for the vertical adjustability of the combined linkage of adjustable block 40, cam-lever 30, connecting rod 50 and push-pull assembly 60 in order to provide the proper downward force necessary to keep valve 70 sealed in the closed position. This is accomplished when locking screws 47 are loosened and drive screw 46 is manually turned (with a wrench or other appropriate hand tool) so that it pushes downwardly against adjustable block 40. As drive screw 46 moves adjustable block 40 downward, closer to valve 70, adjustable block 40 presses cam-lever 30, connecting rod 50 and push-pull assembly 60 downward as well. An airspace 54 is provided between end cap 14 and the top surface of block 40. Airspace 54 thus allows for freedom of movement of block 40, adjustably up or down, without interfering with endcap 14.

The simple mechanical view is that this upward and downward adjustability of block 40 provides for adjusting for a greater sealing force to be applied by the mechanical linkages to keep valve 70 closed. However, in the preferred embodiment, the downward adjustability of block 40 coacts with one or more spring washers 64 (shown and described in more detail relative to FIGS. 6 and 7, below) to apply a desired spring bias thereto. After the proper bias has been set, drive screw 46 and adjustable block 40 are secured in place by tightening locking screws 47. The spring bias will then operate to provide the actual valve closing force. Actuator 10 can then be operated repeatedly to open and close the valve and the coaction of spring washers 64 with the other elements of actuator 10 will maintain the proper sealing force on valve 70.

Figure 4:
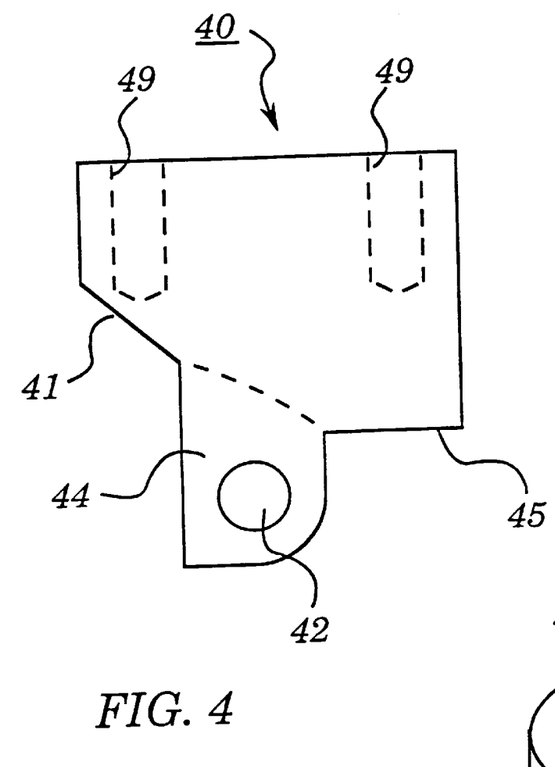
FIG. 4 shows an elevational view of another component part of the actuator of FIGS. 1–3.
Figure 5:
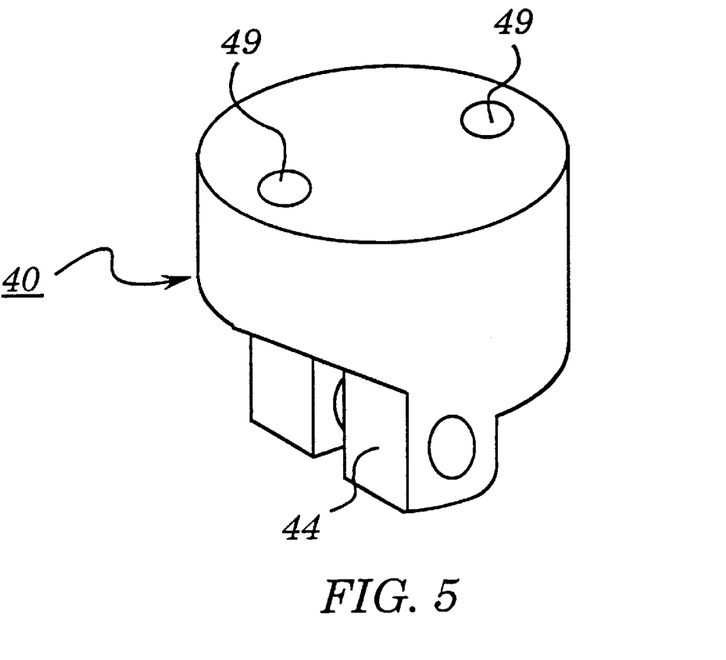
FIG. 5 shows an isometric view of the component part shown in FIG. 4.

However, before addressing the details of the coaction of springs 64 with the other actuator elements, note that adjustable block 40 also has a few additional features which are apparent in FIGS. 4 and 5. First, block 40 has an angled edge 41 which sets the maximum upward rotation that cam-lever 30 can attain. Thus, as shown in FIGS. 2 and 2A, elongated portion 35 of cam-lever 30 comes to rest flush against edge 41 when cam-lever 30 is pivoted into its full valve-closed or valve-sealed position. A raised, generally horizontal surface 45 can provide yet another linkage abutment surface to halt pivotal movement of cam-lever 30 at a desired valve-open level. Short portion 37 would preferably come to rest against surface 45 at the maximum desired rotation of cam-lever 30 into the valve-open position shown in dashed lines in FIG. 2, and in solid lines in FIG. 2B.

Furthermore, in one simplified alternative embodiment of the present invention, adjustable block 40 is not moveable at all. Rather, cam-lever 30 would merely be attachable thereto as if directly to a solid, non-adjustable portion of the housing/sleeve 12 of actuator 10. Indeed, sleeve 12 could take many forms so long as it is mountable in operative relation to valve 70 and supports a pivotal connection for cam-lever 30. Moreover, a simplified non-preferred version could also perform, albeit not as preferred, without the beneficial surfaces 41 and 45 just described. Of course, other alternatives for these are foreseeable as well; for example, adjustable stop surfaces for setting the maximum desired rotation of cam-lever 30 could involve turn-screws against which cam-lever 30 would come into contact. The screwed in or out displacement of such turn-screws would then provide the cam-lever rotation adjustability.

Figures 6, 7:
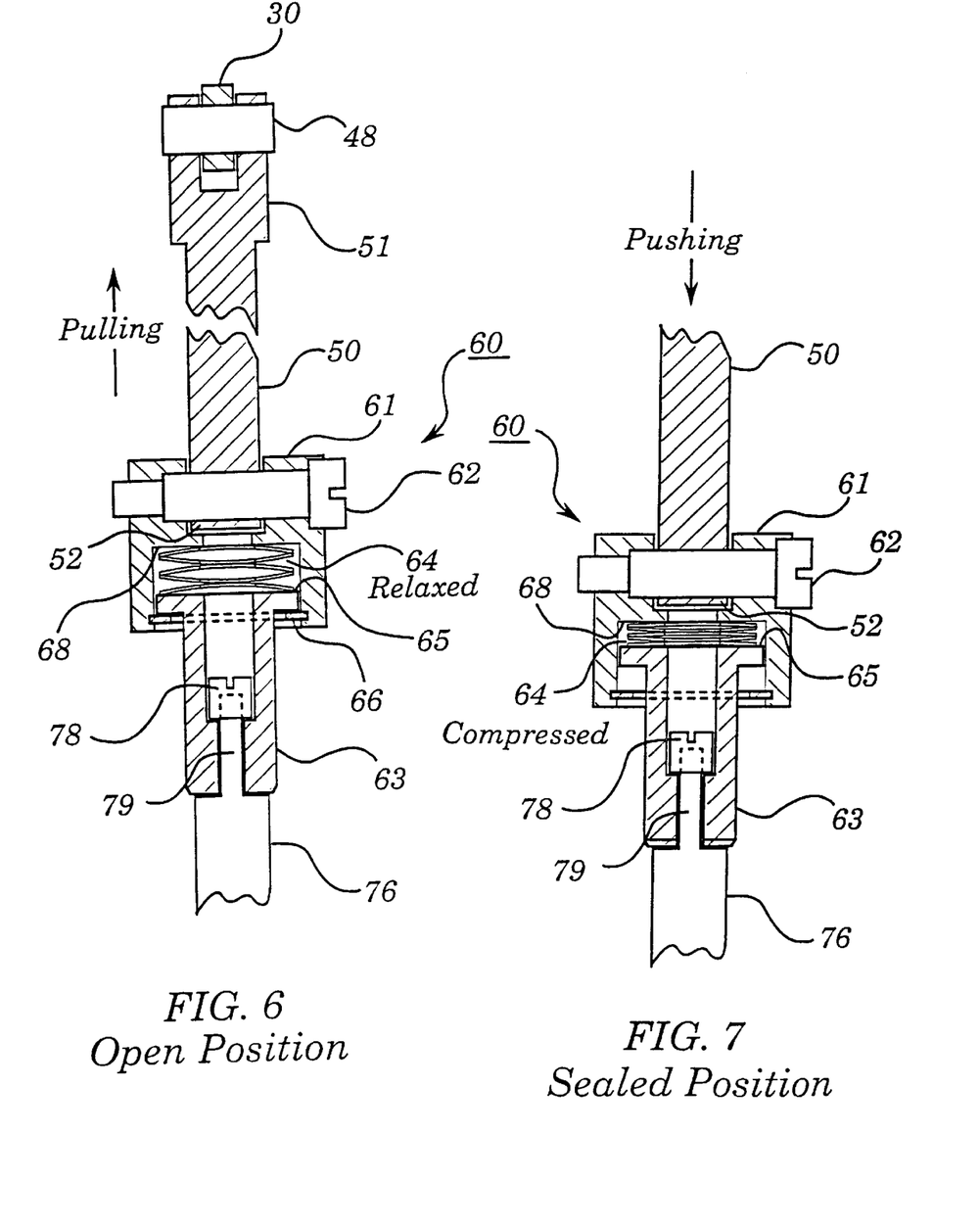
FIG. 6 shows a broken, partially fragmented cross-sectional view of a sub-assemblage of component parts of the actuator of FIGS. 1–5 (taken on line 6—6 of FIG. 2) in which the sub-assemblage is disposed in the open valve position.
FIG. 7 shows another partially fragmented cross-sectional view of the sub-assemblage of component parts shown in FIG. 6 in which the sub-assemblage is disposed in the sealed valve position.

Nevertheless, the preferred embodiment includes an adjustable block 40 and a push-pull assembly 60 which contains a plurality of spring washers 64 as shown in FIGS. 6 and 7. Spring washers 64 are also sometimes referred to as Belleville spring washers and are preferably as shown in FIG. 6, relaxed when actuator 10 opens valve 70 and compressed somewhat when actuator 10 closes valve 70 as shown in FIG. 7. At least one spring washer is desired; however, a plurality are preferred. Five are shown in FIGS. 6 and 7 in alternating orientations disposed within push-pull assembly 60.

As shown in FIGS. 6 and 7, spring washers 64 are disposed inside a hollowed out portion of housing member 61 of push-pull assembly 60. Housing member 61 is preferably a substantially cylindrical member having a transverse opening for pivot pin 62 and three vertically aligned hollowed portions defined therein. Of these hollowed portions in housing member 61; the first is a slot defined to receive second end 52 of connecting rod 50, the second is defined to receive spring washers 64, and a third, being smaller than the first two, is interposed therebetween to provide direct communication from the first to the second hollowed portions therethrough. Furthermore, the second hollowed portion also receives the top end of a valve stem driver 63 which is held therein by an internal retaining ring 66. A groove which has been formed to receive ring 66 is also disposed in housing member 61 in the lower end of the second hollow portion thereof as shown. Thus, springs 64 are held in position between the top surface 65 of stem driver 63 and the interior undersurface 68 of housing member 61.

There are three primary functions of spring washers 64. First, they provide the actual downward compression force on the valve element against the valve seat. As cam-lever 30 rotates into the valve-closed position, it pushes connecting rod 50 downward, which in turn forces down push-pull assembly 60. Spring washers 64 are then compressed by the interior surface 68 of the housing member 61 of push-pull assembly 60 against the top surface 65 of valve stem driver 63 as shown in FIG. 7. Washers 64 then provide the actual downward force on the top surface 65 of valve stem driver 63 to hold valve 70 in sealed closed position as shown in FIG. 7. Because of their elastic nature, spring washers 64 used on an ultra high vacuum valve provide against over-squeezing a copper sealing member against a stainless steel knife edge valve seat inside valve 70. The adjustable biasing feature (from the coaction of the adjustable block 40 with one or more spring washers 64) allows an operator to find and adjust the proper downward sealing force without damaging or excessively wearing the copper sealing member.

In a related fashion, the second function of spring washers 64 is to maintain a constant force on the valve element against the valve seat during periods of thermal expansion and contraction. Washers 64 thus expand or contract as necessary during such fluctuations in temperature while maintaining a sufficient closure force on valve 70.

The third primary function involves the oppositely acting force of springs 64 which is inherently reactive upward against the interior surface 68 of housing member 61 of push-pull assembly 60. This provides the impetus to lock the mechanical linkages in the closed position shown in FIGS. 2 and 2A, particularly when the combination of cam-lever 30 and connecting rod 50 have been rotated through and past the centerline position to the over center position. This over center position is more clearly shown in FIG. 8.

Figure 8:
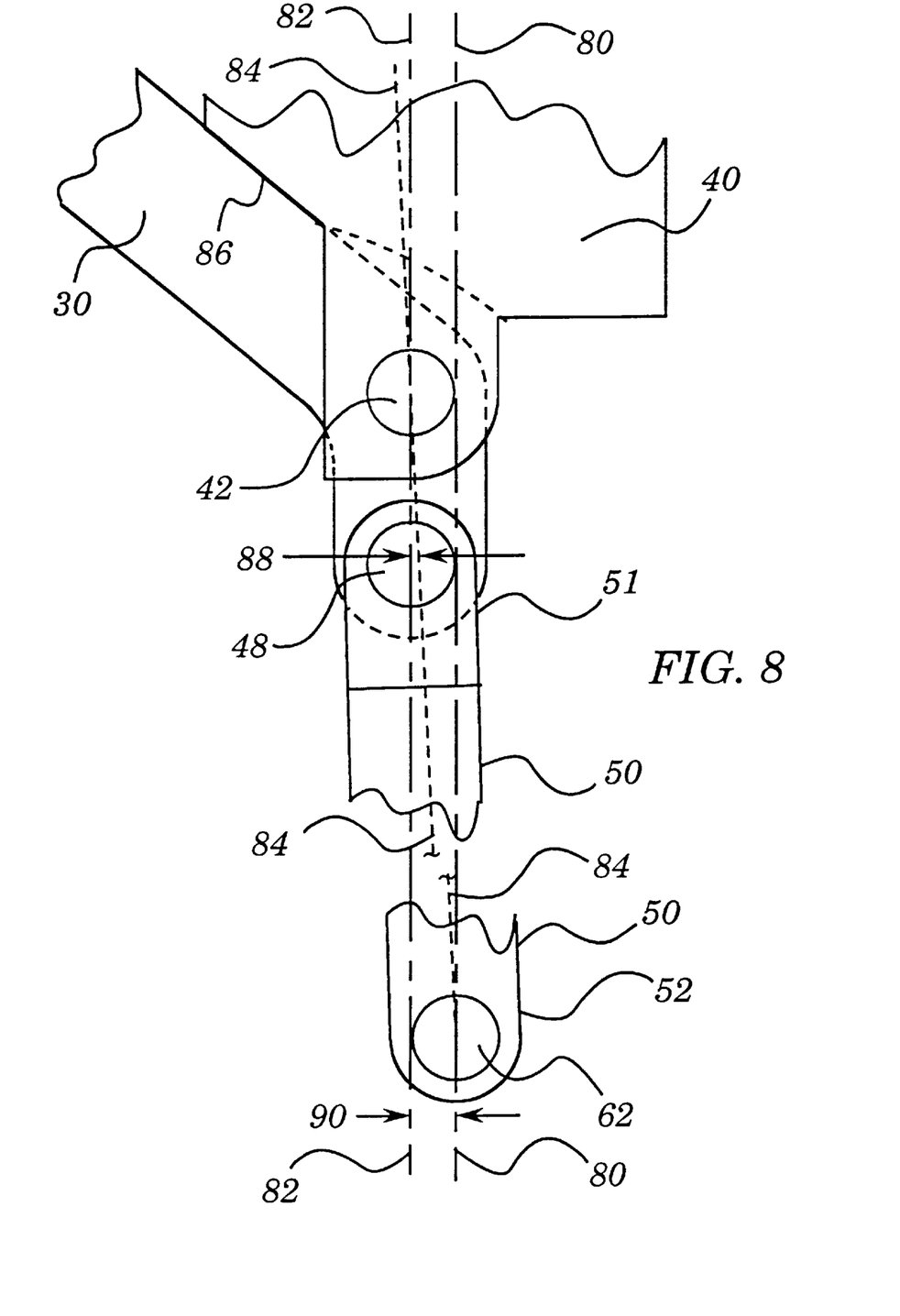
FIG. 8 shows a broken, fragmented elevational view of another sub-assemblage of component parts of the present invention.

In particular in FIG. 8, connecting rod 50 is shown as the bulk of rod 50 has been rotated through first centerline 80 to its final, closed position in which the center/pivot point defined by the circle representing pivot pin 48 is substantially lined up with a second centerline 82 which is disposed directly through the center/pivot point of pivot pin 42. Second centerline 82 is parallel to and disposed a constant distance 90 to the left of first centerline 80. A third centerline 84 is also defined in FIG. 8 and is angularly disposed relative to first and second centerlines 80 and 82. Third centerline 84 is defined by the center/pivot points defined by pivot pins 42 and 62. This third centerline 84 is the preferred critical centerline which is used to define the over center, locking position. As the mechanical linkages pivot toward the closed position, the maximum downward movement of push-pull assembly 60 occurs when the center/pivot points of all three pins 42, 48 and 62 are lined up along angularly disposed centerline 84. This represents the maximum elongation that the mechanical linkages achieve. This is dead center. Maximum compression on spring washers 64 also occurs at this alignment. Then, with continued pivotal movement in the same direction, the downwardly extended length of the mechanical linkages will then begin to shorten again and thus begin a lifting upward movement on push-pull assembly 60. A slight amount of this shortening, over center movement is desired; indeed, as soon as the centerpoint of pin 48 travels to the left of third centerline 84, even just slightly as shown by the distance 88 in FIG. 8, spring washers 64 react from their compressed state to urge the mechanical linkages to continue this leftward and upward pivotal motion. The maximum leftward motion is preferably defined by the engagement of cam-lever 30 with surface 41 of block 40 at interface 86. This interface 86 will also define the maximum value of the distance 88 that the centerpoint of pin 48 travels past centerline 84. Distance 88 is preferably as minimal as possible and thus may appear exaggerated in the drawings for emphasis. Note, when disposed in this position, pneumatic or whatever power driver forces have been imposed on cam-lever 30 can be removed (for example, pneumatic driver 20 can be completely removed from the system) and spring washers 64 will continue to urge the mechanical linkages to remain in this over center position and thus locked closed. Moreover, spring washers 64 will continue to hold this locked-closed position until a sufficient force is applied to the mechanical linkages to overcome the spring forces. This overcoming force can be variable according to the desired purpose and will depend, of course, upon a variety of factors including the spring constants of the spring washers, the number of washers used and also the biasing applied by the adjustment of adjustable block 40.

Still further, the inherent compressibility of springs 64 allows for achieving more than simply locking into the over center locking position. It allows for reaching the over center position even after valve closure. This is particularly the case in the ultra high vacuum systems discussed above. Thus, it can be appreciated that with substantially inelastic valve sealing elements, there would be no substantial "play" or further movement of the mechanical linkages when the usual copper sealing element of an ultra high vacuum valve is forced against the stainless steel knife-edge valve seat. And, if no springs or their equivalent were to be used with a mechanical linkage arrangement as described herein, then the linkages would be brought to a halt in their downward rotation either just before or exactly at the centerline 84 position. Full, steadfast closure of the copper element against the knife-edge will not allow linkage movement further as is necessary to move beyond center. The linkages would stop when the valve closes either before or at dead center. However, with springs 64, closure can be achieved before or at the linkage rotation to the centerline 84 position, and then springs 64 can yield slightly further in compression by the continued further downward movement of push-pull assembly 60 and the downward and pivotal movement of bottom end 52 of rod 50. This spring yield occurs after valve closure while also continuing to maintain the necessary downward closure force on the valve seat. Then, once the centerline 84 position has been passed, even just slightly, and cam-lever 30 begins to pull rod 50 and push-pull assembly 60 a very slight distance upward as well; movement of springs 64 will also change direction at this point from maximum compression to rebound to push upwardly on interior surface 68 of housing member 61 to assist in urging the linkages upward. As described, this upward linkage movement continues until the edge of portion 35 of cam-lever 30 comes to rest against edge 41 of adjustable block 40 at 86. However, the upward spring force from springs 64 continues to press upward to lock the linkages in this off center, valve closed position. Again, this spring locking force continues even after the closing driver force from pneumatic driver 20, or its equivalent, is halted. However, once valve 70 is closed in this fashion, the spring force also continues to hold valve 70 closed from initial valve closure to the over center, locked position. Thus, driver 20 or its equivalent can be removed from the system also without interrupting the closure of valve 70.

The power driver device (which has been described as preferred above as a pneumatic driver 20) can be any conventional drive device including, but not limited to, electrical, pneumatic, hydraulic or vacuum powered drive devices (none of which alternatives being shown in the drawings attached hereto). A pneumatic driver as described is preferred for simplicity in its adaptability to be connected to existing actuator control equipment such as computer control systems. Pneumatic drivers of this type are currently commercially available.

It is also preferable that the power drive device (of whatever kind) be detachably mounted outside support sleeve 12 in such a way that it is free to pivot to follow the action of cam-lever 30. Detachability is preferred so that the power drive device may be easily removed from the actuator while leaving the remainder of the actuator connected to the valve so that the vacuum system into which the valve has been integrated can be "baked out" as necessary to achieve the high and ultra high vacuum conditions desired. During this "bake out" procedure the entire system is subjected to extremely high temperatures (on the order of 350 degrees centigrade), temperatures which a suitable power drive device may not be sufficiently designed to withstand. When used with an actuator 10 of the present invention in this way, then, the power drive device need not be designed to withstand such temperatures. Moreover, with the present invention, the human operator can still manually operate the actuator when the power drive device has been removed. This is done by manually moving the elongated lever end of cam-lever 30 up or down by hand.

Figure 9:
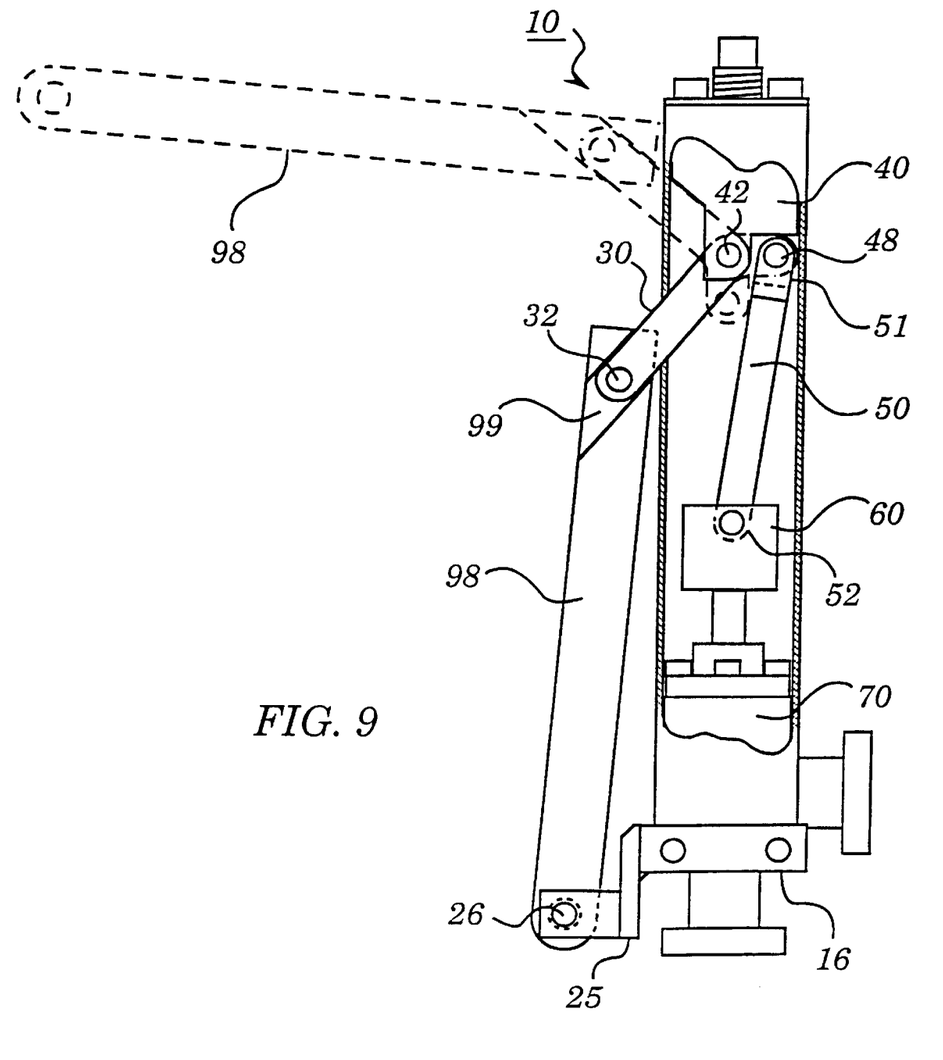
FIG. 9 shows a sectional side view of an actuator of the present invention in which the pneumatic driver has been removed and replaced with an extension handle/clamping open device.

Indeed, as is shown in FIG. 9, cam-lever 30 is also adapted to be connected to an extension handle 98 (shown in dashed lines) which facilitates the manual movability of the mechanical linkages of actuator 10 through cam-lever 30. Specifically, handle 98 is an elongated, preferably solid link member having, as shown, a slot 99 formed in one end thereof. Slot 99 is preferably made to correspond directly with cam-lever 30 such that cam-lever 30 fits securely therein. A hole for receiving pin 32 is also defined in slot 99 so that cam-lever 30 may be firmly attached to handle 99. Slot 99 is preferably angularly disposed as shown to provide the preferred range of motion for handle 98 indicated in FIG. 9 (from the somewhat horizontal, valve-sealed position shown in dashed lines to the almost vertical, valve-open position shown in solid lines); however, other dispositions and modes of connection may also be used herewith and remain within the spirit of this invention.

Moreover, as is also shown in FIG. 9, handle 98 (as shown in solid lines) is also adapted to be a "hold-open" device which is used to hold the actuator linkage members, and thereby also the valve itself, in the valve open position for bake-out. As may be understood in the art, handle or device 98 could also be referred to structurally or functionally as a type of "bake-out clamp." As described, many power driver devices, including the preferred pneumatic device 20, are not designed to withstand the high bake-out temperatures involved in high and ultra high vacuum outgassing. Thus, with the valve disposed in open position, the power driver device can simply be removed and device 98 substituted therefor. As can be understood from FIG. 9, pivot pins 26 and 32 would be removed to detach the power driver device, and then, when hold-open device 98 has been properly positioned relative to connecting member 25 and cam-lever 30, pins 26 and 32 are re-inserted into their respectively defined openings in connecting member 25 and cam-lever 30 as well as into corresponding holes defined in device 98. As shown, device 98 can be a solid linkage having two holes defined therein at a properly spaced distance relative to an actuator 10. Certain adjustability therein is also preferred, perhaps involving multiple holes or elongated slots defined in the ends of linkage 98.

Still further, other forms of bake-out clamps may also be used herewith. For example, a wire device (not shown) having hooking members at first and second ends thereof can be connected at its first end to the exterior surface of sleeve 12 below the protruding portion of cam-lever 30 (or, it could similarly be detachably mounted in or to connecting member 25). Then, the second end thereof would be connectable to cam-lever 30 after the power driver device has been removed.

The design of this actuator provides for easy installation on valves already incorporated in operating vacuum systems without disrupting the system vacuum. In particular, actuator 10 may be attached to a valve 70 which is already disposed in a pipe system such as that shown by representative pipes 19 in a pre-established vacuum pumping system.

To install in such a situation, first, the manual valve control mechanism such as the pre-existing drive screw from a pre-existing valve 70 is removed. In the preferred embodiment, the pre-existing drive screw would then be implemented into actuator 10 as drive screw 46 and disposed in cap 14 at the top end 15 of actuator 10. A VARIAN vacuum valve, model no. 951-5014 (among others), as presently available, provides a suitable drive screw for this purpose. VARIAN vacuum valves are made by VARIAN Vacuum Products, Inc.

First, however, in order to remove drive screw 46 from a vacuum valve such as this, a nut 78, as shown in FIGS. 6 and 7, that is also a pre-existing component thereof must be removed. Thus, nut 78 is backed out off the threaded portion 79, also as shown in FIGS. 6 and 7, which in this valve 70 is integral with and extends from stem 76. Then, drive screw 46 can be removed therefrom and disposed in end cap 14 as shown and described. The next step is to place a pre-assembled push-pull assembly 60 of the present invention in operative position superposed above stem 76. As can be seen in more detail in referring to FIGS. 6 and 7, stem driver 63 is hollowed out such that threaded portion 79 of stem 76 can be inserted therein. Then, nut 78 is inserted into and passed through the hollow sections of housing member 61 and washers 64 and down into the upper hollow portion of stem driver 63 to be re-attached to the upper end of threaded portion 79 of stem 76 inside the upper hollow area of stem driver 63. Thus, stem driver 63 is firmly connected to valve stem 76 of valve 70. Note, the push-pull assembly 60 comprises housing member 61, spring washers 64 and stem driver 63 which is held in place by retaining ring 66. It is presumed for purposes of this description of the preferred embodiment that push-pull assembly 60 has been previously disconnected from the remaining elements of actuator 10, most specifically being initially disjoined at the pivotal connection to connecting rod 50. Indeed, the contemplated consumer package is preferably originally separated this way. Moreover, the push-pull assembly 60 is preferably pre-assembled as well. The pre-assembly of this sub-assembly involves the predisposition of one or more spring washers 64 in the hollow spring washer chamber defined under inner surface 68 of housing member 61 of push-pull assembly 60 Then, the upper head end of stem driver 63 is placed in the spring chamber such that the upper surface 65 thereof is disposed in contact with the lower spring 64. An internal retaining ring 66 is then maneuvered into position within a groove defined therefor in the lower inner surface of the hollow of housing member 61. This then holds the head of stem driver 63 within the spring chamber of push-pull assembly 60. It is preferred for consumer purposes to have the push-pull assembly 60 remain fully assembled, though disassembly may be effected for maintenance, replacement or repair as necessary or desired (such as for changing springs 64). As such, push-pull assembly 60 is hollow throughout, from top to bottom (though necessarily involving two distinct cylindrical diameters and an upper slotted portion); as are spring washers 64, thus allowing for the simple insertion of nut 78 and a tool (not shown) to replace nut 78 on threaded portion 79 of stem 76 within stem driver 63.

Then, connecting rod 50 is connected to push-pull assembly 60. Preferably, connecting rod 50 has already been connected to cam-lever 30 and disposed in sleeve 12 by the connection of cam-lever 30 to adjustable block 40. The connection of cam-lever 30 to adjustable block 40 may be accomplished inside sleeve 12 by using access port 94 to insert pin 42 into the corresponding holes defined therefor in legs 44 of block 40 and the hole in cam-lever 30. Then, sleeve 12 is positioned over valve 70 and slid down so that the bottom end 52 of connecting rod 50 is properly disposed in the upper slotted portion of housing member 61 and access can be made through port 92 for inserting pin 62 into the corresponding holes in both rod 50 and housing member 61. Push-pull assembly 60 is thus operatively attached to the mechanical linkages of actuator 10. Then, pins 18 are inserted in base 16 to secure sleeve 12 in place on valve 70.

Lastly, if not previously so connected, the power driver 20 would then be connected to connecting member 25 and the protruding end 34 of cam-lever 30 using pivot pins 26 and 32 as previously described. Preferably, power driver 20 would be pre-disposed thereon, particularly in consumer-oriented applications. Either way, then the corresponding pneumatic tubes (or other actuator control lines, neither shown) emanating from the air compressor or other control source (computer control, for example) can be connected to the power driver, to air inlets 23 and 24 for example. Thus, actuator 10 is ready for operation to open and close valve 70 as desired. Of course, handle 98 could alternatively be used to open and close valve 70 as desired.

The above-described steps for actuator installation could also be performed prior to having connected valve 70 into a vacuum system. Moreover, as a further alternative, the primary functional elements of an actuator 10 may also be simultaneously and integrally manufactured with the valve itself to produce a single, indivisible valve/actuator device. Such a device would then be incorporable into a vacuum system in a fashion as are contemporary valves. This provides the advantage of an automated valve which need not be later modified by the further installation of an actuator 10 as described above.

As briefly mentioned in the background section above, choice of materials for actuator 10 will depend greatly on its intended use. In the preferred embodiment which is especially adapted for ultra high vacuum use, all component parts will be made of stainless steel. Materials other than stainless steel may be substituted so long as they share the characteristics of strength and endurance to the exceedingly high temperatures to which the actuator will be subjected in ultra high vacuum settings. Other uses are foreseeable, and thus would not dictate such rigorous material characteristics. Again, the pneumatic or other power device to be used herewith need not meet these exacting standards either. As described even for ultra high vacuum systems, the power driver may be removed from the system leaving the actuator in place with a "bake-out clamp" to hold the valve open during outgassing.

The primary component parts of actuator 10 are preferably either welded together or connected with detachable pins, screws or other retaining members. Thus, base 16 and cap 14 would be welded to sleeve 12. Likewise, connecting member 25 is welded to base 16. The other primary parts are preferably detachably attached to each other using pins, screws or the like; many of which are pivotal attachments as described. The removable retaining ring 66 connection is an exception.

All references to orientation or direction such as "upward," "downward," "left," "above" or the like are not to be limiting in any material respect, rather are intended only to facilitate description of the preferred embodiment particularly as shown in the drawings. The present invention remains operable regardless of its resulting orientation in three dimensional space; whether disposed sideways or completely inverted from the example depicted in the drawings.

From the foregoing, it can readily be discerned that a new and useful invention has been shown and described which achieves the desired purposes therefore in a new and unapparent manner. All modifications which may readily occur to an artisan are fully intended within the spirit of this disclosure.

Accordingly, what is claimed is:

1. An actuator for a valve in which the valve has a push-pull valve stem disposed therein, said push-pull valve stem being reciprocally operable to open and close said valve, said actuator comprising:

an actuator support member which is adapted to be disposed in operable fixed position relative to said valve, said support member being disposed to provide a non-movable foundation during operation of the actuator;

an adjustable block which is adjustably connected to said support member in a variable but fixed operative position, said adjustable block having a linkage pivot point defined therein, said adjustable block being adjustable to ensure that a proper closing force is presented by the actuator to the valve;

a cam-lever which has a primary end, a secondary end and a body portion disposed therebetween, said primary end having a first pivot point defined therein, said secondary end having a second pivot point defined therein and said body portion having an intermediate pivot point defined therein, said cam-lever being pivotally connected at said intermediate pivot point to said adjustable block such that said linkage pivot point and said intermediate pivot point coincide, said cam-lever thereby being pivotally moveable relative to said adjustable block and said support member about the coincident linkage/intermediate pivot point;

a connecting rod having a first end and a second end, said first end of said connecting rod being pivotally connected to said second end of said cam-lever such that said connecting rod is pivotally moveable about said second pivot point defined in said cam-lever, and said second end of said connecting rod being operably linked to the push-pull valve stem of the valve;

whereby said cam-lever is pivotably moveable relative to said adjustable block alternately in one direction and in reverse about the coincident linkage/intermediate Divot Point so that said cam-lever, when thus pivotally moved, thereby moves said connecting rod which in turn causes said valve stem to move into alternate open and closed positions to alternately open and close said valve.

2. An actuator according to claim 1 which further comprises a power device which is detachably connected at one end thereof to said support member, and at the other end there of, i s pivotally linked to said primary end of said cam-lever such that said cam-lever is pivotal relative to said power device about said first pivot point defined in said primary end of said cam-lever; said power device being operable to move said cam-lever to move said connecting rod to ultimately move said valve stem to open and close said valve.

3. An actuator according to claim 1 which further comprises a detachable extension handle which is detachably attachable to the primary end of said cam-lever, said extension handle being operable to move said cam-lever to move said connecting rod to ultimately move said valve stem to open and close said valve.

4. An actuator according to claim 1 in which said support member is a hollow cylinder which is adapted to be disposed on the valve body of said valve.

5. An actuator according to claim 1 which further comprises a push-pull driver member interposed between and connected to both said second end of said connecting rod and said valve stem, said push-pull driver member being pivotally connected to said second end of said connecting rod such that it will provide translational, alternate push and pull motions to said valve stem in response to alternate reciprocal movements of said connecting rod, said translational, alternate push and pull motions being sufficient to alternately cause said valve stem to alternately open and close said valve.

6. An actuator according to claim 5 in which said push-pull driver member further comprises at least one spring member, whereby said spring member provides for the movement of said cam-lever and said connecting rod to an over-center position to lock the valve in closed position; whereby the over-center locking position is defined by the movement of the pivotal connection of the cam-lever and the connecting rod at said second Divot point of said cam-lever past the line defined by the coincident linkage/intermediate pivot point and the pivotal connection point of the connecting rod to the push-pull driver member.

7. An actuator according to claim 1 in which the cam-lever and the connecting rod are adapted to move to an over-center position to lock the valve in closed position; whereby the over-center locking position is defined by movement of the pivotal connection of the cam-lever to the connecting rod at said second pivot point of said cam-lever past the line defined between said coincident linkage/intermediate pivot point and the point of operable linkage of said second end of said connecting rod to said push-pull valve stem of the valve.

8. An actuator according to claim 5 in which said push-pull driver member further comprises at least one spring member, whereby said spring member provides the closure force to said valve stem to hold the valve in closed position, and whereby the connecting rod and cam-lever provide a linkage force to said spring member for said spring member to transfer said linkage force to said closure force, and whereby said adjustable block provides for moving said linkages toward said push-pull driver member to increase said linkage force which said spring member transfers to increase said closure force to thereby provide for adjusting to the proper closure force for holding the valve in closed position.

9. An actuator for a valve comprising:

a support member which has a first end and a second end and which is adapted to be disposed in operative relationship to a valve, said support member being disposed to provide a non-movable foundation during operation of the actuator;

a push-pull sub-assembly which is adapted to be connected to the valve stem of the valve; whereby upon being so connected to said valve stem and upon movement of said push-pull sub-assembly, said push-pull sub-assembly moves said valve stem to alternately open and close said valve, said push-pull sub-assembly having a spring member disposed therein which is adapted to lock the valve in closed position; and a sub-assemblage of mechanical linkages including a cam-lever and a connecting rod each having a first and a second end, said first end of said connecting rod being pivotally connected to said second end of said cam-lever at a rod/lever pivot point, said cam-lever being pivotally linked to said support member at an intermediate pivot point defined in said cam-lever; said first end of said cam-lever being exposed and movable by an external force, and the second end of said connecting rod being pivotally connected to said push-pull sub-assembly at a push-pull pivot point; whereby movement of said first end of said cam-lever causes pivoting of said sub-assemblage of mechanical linkages which causes said second end of said connecting rod to move said push-pull sub-assembly to move said valve stem to alternately open and close said valve;

whereby the intermediate and push-pull pivot points define a center line; and whereby said cam-lever and said connecting rod coact with said spring member in said push-pull member to pivot to an over-center position to lock the valve in closed position, the over-center position being defined by the movement of the rod/lever pivot point past the center line defined by the intermediate and push-pull pivot points.

10. An actuator according to claim 9 which further comprises a power drive device which is connected to said first end of said cam-lever; said power drive device being operable to move said first end of said cam-lever to thereby move said sub-assemblage of mechanical linkages to move said push-pull sub-assembly to alternately open and close said valve.

11. An actuator according to claim 9 which further comprises a detachable extension handle which is detachably attachable to the first end of said cam-lever, said extension handle being operable to move said cam-lever to move said connecting rod to move said push-pull sub-assembly to ultimately move said valve stem to alternately open and close said valve.

12. An actuator according to claim 9 which further comprises an adjustable block which is adjustably connected to said support member in operative superposed relationship to said sub-assemblage of mechanical linkages; said cam-lever being pivotally linked to said support member by being pivotally connected to said adjustable block about said intermediate pivot point defined in said cam-lever, and said adjustable block being adjustable to ensure that a proper closing force is presented by the actuator to the valve.

13. An actuator according to claim 12 which further comprises a drive screw which is connected to said support member and is disposed in operative superposed relationship to said adjustable block, said drive screw providing translational adjustability to move said adjustable block thereby providing the ensurance that a proper closing force is presented by the actuator to the valve.

14. An automated valve assemblage comprising:
   a valve device which includes a valve body having disposed therein a valve seat, a reciprocally moveable valve element, and a reciprocally moveable valve stem, said valve stem being connected to said valve element and being operable to reciprocally move said valve element in and out of valve sealing engagement with said valve seat to thereby alternately open and close said valve device; and
   an actuator device for automating the movement of said valve stem to fully open or fully close said valve device, said actuator device having:
     an actuator support member which is disposed in operable fixed position relative to said valve device, said actuator support member being disposed to provide a non-movable foundation during operation of the actuator device;
     an adjustable block which is adjustably connected to said actuator support member in a variable but fixed operative position, said adjustable block having a linkage pivot point defined therein, said adjustable block being adjustable to ensure that a proper closing force is presented by the actuator device to the valve device;
     a cam-lever which has a first end, a second end and a body portion therebetween, said first end having a first pivot point defined therein, said second end having a second pivot point defined therein and said body portion having an intermediate pivot point defined therein, said cam-lever being pivotally connected at said intermediate pivot point to said adjustable block such that said linkage pivot point and said intermediate pivot point coincide, said cam-lever thereby being pivotally moveable relative to said adjustable block and said support member about the coincident linkage/intermediate pivot point; and
     a connecting rod having a first end and a second end, said first end of said connecting rod being pivotally connected to said second end of said cam-lever such that said connecting rod is pivotally moveable about said second pivot point defined in said cam-lever, and said second end of said connecting rod being operably linked to the reciprocally moveable valve stem of the valve device;
   whereby said cam-lever is pivotably moveable relative to said adjustable block alternately in one direction and in reverse about the coincident linkage/intermediate pivot point so that said cam-lever, when thus pivotally moved, thereby moves said connecting rod which thereby in turn moves said valve stem into alternate open and closed positions to open and close said valve device.

15. An actuator according to claim 14 which further comprises a power device which is connected at one end thereof to said support member, and at the other end thereof, is pivotally linked to said first end of said cam-lever such that said cam-lever is pivotal relative to said power device about said first pivot point defined in said first end of said cam-lever; said power device being operable to move said cam-lever to move said connecting rod to ultimately move said valve stem to open and close said valve.

16. An automated valve assemblage according to claim 14 which further comprises a push-pull driver member interposed between and connected to both said connecting rod and said valve stem, said push-pull driver being adapted to translate motion to said valve stem in response to movement of said connecting rod, said motion being sufficient to cause said valve stem to alternately open and close said valve device.

17. An automated valve assemblage according to claim 16 in which said push-pull driver member further comprises at least one spring member, whereby said spring member provides for the movement of said cam-lever and said connecting rod to an over-center position to lock the valve device in closed position; whereby the over-center locking position is defined by the movement of the pivotal connection of the cam-lever and the connecting rod at said second pivot point of said cam-lever past the line defined by the coincident linkage/intermediate pivot point and the pivotal connection point of the connecting rod to the push-pull driver member.

18. An actuator according to claim 14 in which the cam-lever and the connecting rod are adapted to move to an over-center position to lock the valve in closed position; whereby the over-center locking position is defined by movement of the pivotal connection of the cam-lever to the connecting rod at said second pivot point of said cam-lever past the line defined between said coincident linkage/intermediate pivot point and the point of operable linkage of said second end of said connecting rod to said push-pull valve stem of the valve.

19. An actuator according to claim 14 in which said push-pull driver member further comprises at least one spring member, whereby said spring member provides the closure force to said valve stem to hold the valve in closed position, and whereby the connecting rod and cam-lever provide a linkage force to said spring member for said spring member to transfer said linkage force to said closure force, and whereby said adjustable block provides for moving said linkages toward said push-pull driver member to increase said linkage force which said spring member transfers to increase said closure force to thereby provide for adjusting to the proper closure force for holding the valve in closed position.

* * * * *